US012776730B2

(12) United States Patent
Yang et al.

(10) Patent No.: US 12,776,730 B2
(45) Date of Patent: Oct. 27, 2026

(54) MOTOR POSITION ESTIMATION USING CURRENT RIPPLES

(71) Applicant: Magna Seating Inc, Aurora (CA)

(72) Inventors: Hanlong Yang, Novi, MI (US); Ruihang Wu, West Bloomfield, MI (US); Matthew J. Kobberstad, Northville, MI (US)

(73) Assignee: MAGNA SEATING INC., Aurora (CA)

( * ) Notice: Subject to any disclaimer, the term of this patent is extended or adjusted under 35 U.S.C. 154(b) by 15 days.

(21) Appl. No.: 18/562,432

(22) PCT Filed: May 20, 2022

(86) PCT No.: PCT/US2022/030226

§ 371 (c)(1),
(2) Date: Nov. 20, 2023

(87) PCT Pub. No.: WO2022/246176

PCT Pub. Date: Nov. 24, 2022

(65) Prior Publication Data

US 2024/0267033 A1 Aug. 8, 2024

(51) Int. Cl.

| | |
|---|---|
| ***H02P 7/00*** | (2016.01) |
| ***B60N 2/02*** | (2006.01) |
| ***B60N 2/06*** | (2006.01) |

(52) U.S. Cl.

CPC .............. *H02P 7/0094* (2013.01); *H02P 7/00* (2013.01); *B60N 2/02246* (2023.08); *B60N 2/0244* (2013.01); *B60N 2/06* (2013.01); *B60N 2230/30* (2023.08)

(58) Field of Classification Search

CPC ..... H02P 7/0094; H02P 7/00; B60N 2/02246; B60N 2/0244; B60N 2/06; B60N 2230/30

See application file for complete search history.

(56) References Cited

U.S. PATENT DOCUMENTS

| | | | |
|---|---|---|---|
| 6,847,914 | B2 | 1/2005 | Gerlach |
| 7,345,446 | B2 | 3/2008 | Pino et al. |
| 8,169,178 | B2 | 5/2012 | Letor et al. |
| 11,159,112 | B2 | 10/2021 | Preindl |

(Continued)

FOREIGN PATENT DOCUMENTS

| | | | | |
|---|---|---|---|---|
| CN | 101585324 A | * 11/2009 | | B60N 2/0244 |
| CN | 114572067 A | * 6/2022 | | B60N 2/0722 |

(Continued)

OTHER PUBLICATIONS

CN-101585324-A (Year: 2009).*
CN-114572067-A (Year: 2022).*

*Primary Examiner* — Ryan D Walsh
(74) *Attorney, Agent, or Firm* — Miller Canfield

(57) ABSTRACT

A method is provided for monitoring a motor within a seat assembly in an automotive vehicle. The method comprises the steps of measuring raw current values drawn by the motor to reposition the seat assembly, temporally dividing the raw current values into sections based on size and variations in the raw current values, filtering the raw current values in each section to obtain filtered current values, detecting local peaks within the filtered current values, and determining a rotational position or a speed of the motor based on the detected local peaks.

4 Claims, 13 Drawing Sheets

(56) References Cited

U.S. PATENT DOCUMENTS

| | | | |
|---|---|---|---|
| 2014/0001815 | A1 | 1/2014 | Tanaka et al. |
| 2019/0253010 | A1 | 8/2019 | Son et al. |
| 2019/0390500 | A1 | 12/2019 | Pellegrinetti et al. |
| 2020/0186062 | A1 | 6/2020 | Fancellu et al. |
| 2020/0343842 | A1 | 10/2020 | Breynaert et al. |
| 2021/0044228 | A1 | 2/2021 | Forster et al. |

FOREIGN PATENT DOCUMENTS

| | | |
|---|---|---|
| DE | 19834108 | 6/2001 |
| EP | 2688197 | 1/2014 |
| JP | 5773932 | 9/2015 |

* cited by examiner

MOTOR POSITION ESTIMATION USING CURRENT RIPPLES

CROSS-REFERENCE TO RELATED APPLICATIONS

This application claims priority to U.S. Provisional Application 63/190,995, filed on May 20, 2021, the disclosure of which is hereby incorporated by reference in its entirety.

BACKGROUND OF THE INVENTION

1. Field of the Invention

The present disclosure relates generally to a method for monitoring and controlling an electric motor. More particularly, the invention relates to a method for determining a rotational position and/or a speed of a brushed direct current electric motor from a plurality of ripple peaks of the motor's current.

2. Description of Related Art

Brushed direct current (DC) motors are commonly used in automotive power seat assemblies. For more complex applications, such as memory seats or anti-pinch functions, hall effect sensors are included with the motors to provide position feedback to an embedded electronic control unit (ECU). The ECU controls the movement and positioning of the seat assemblies based in part on the position feedback from the hall effect sensors.

However, adding hall effect sensors to the seat assemblies adds cost and complexity due to the hall effect sensors, extra wires connected between the hall effect sensors and the ECU, and additional digital channels on a controller in the ECU for processing the hall effect signals. Eliminating the hall effect sensors improves system level reliability as well as reducing overall cost of the seat assemblies. It is further desirable to eliminate the hall effect sensors so the extra wires and additional data channels on the controller are not required.

SUMMARY OF THE INVENTION

According to one embodiment, there is provided a method for monitoring a motor within a seat assembly in an automotive vehicle. The method comprises the steps of measuring raw current values drawn by the motor to reposition the seat assembly, temporally dividing the raw current values into sections based on size and variations in the raw current values, filtering the raw current values in each section to obtain filtered current values, detecting local peaks within the filtered current values, and determining a rotational position or a speed of the motor based on the detected local peaks.

According to another embodiment, there is provided a method for monitoring a motor within a seat assembly in an automotive vehicle. The method comprises the steps of measuring raw current values drawn by the motor to reposition the seat assembly, temporally dividing the raw current values into sections based on size and variations in the raw current values, filtering the raw current values in each section to obtain filtered current values, determining a median value of the filtered current values for each section to obtain a plurality of sequential median values, determining a trend in the plurality of sequential median values, removing the trend from the plurality of sequential median values to obtain detrended values, determining a difference in magnitude between successive detrended values to obtain delta values, identifying a plurality of peaks in the delta values, determining which of the plurality of peaks has an amplitude greater than a threshold, wherein the peaks having an amplitude greater than the threshold correspond to detected local peaks within the filtered current values, and determining a rotational position or a speed based on the detected local peaks.

According to another embodiment, there is provided a method for extracting current ripples from raw current values drawn by a motor within a seat assembly in an automotive vehicle. The method comprises the steps of measuring the raw current values drawn by the motor to reposition the seat assembly, temporally dividing the raw current values into sections based on size and variations in the raw current values, filtering the raw current values in each section to obtain filtered current values with different design parameters, and detecting local peaks within the filtered current values, wherein the local peaks correspond to the current ripples.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

The present invention relates to systems and methods for detecting a rotational position and/or speed in the operation of seat assemblies 10 in automotive vehicles. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
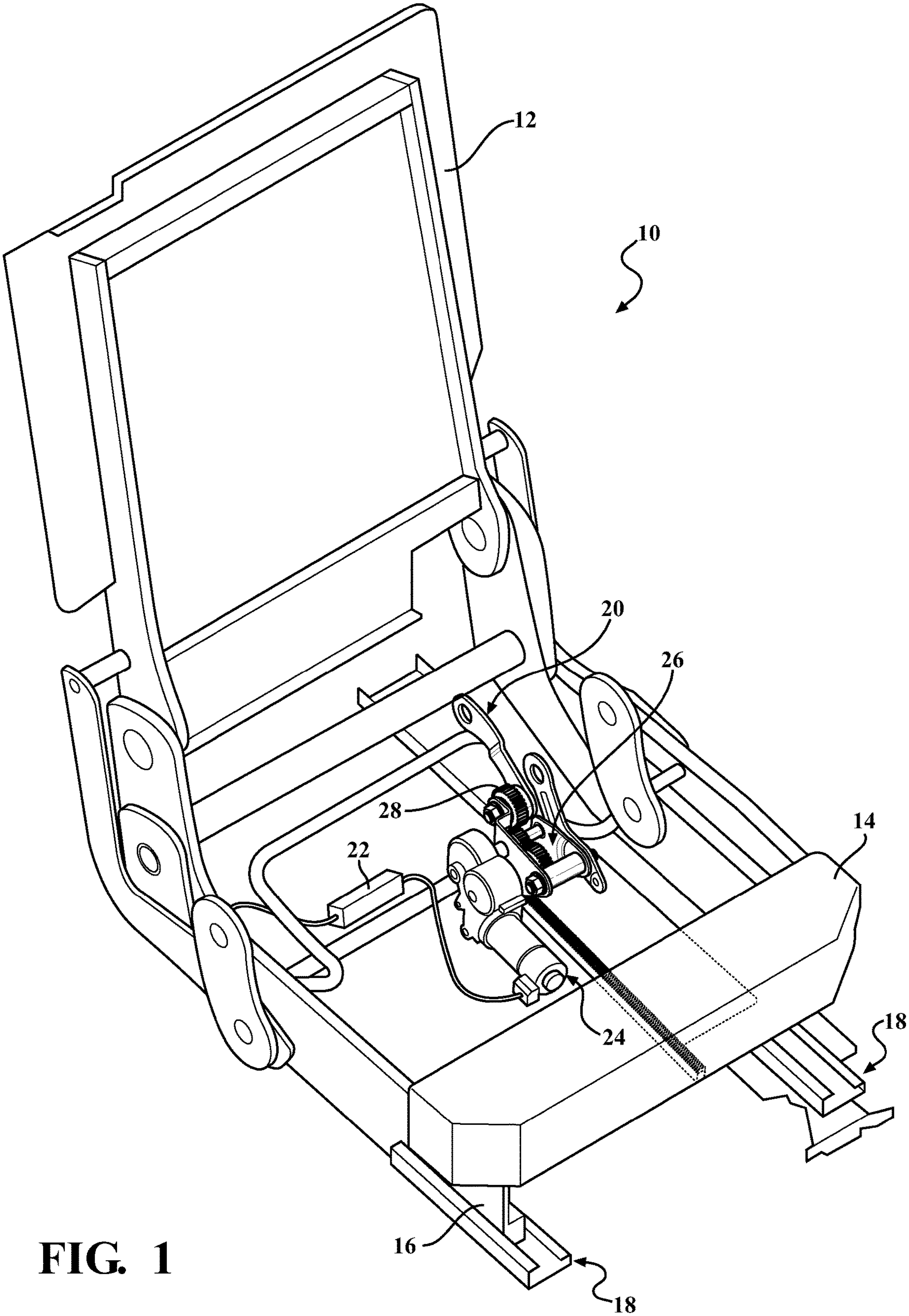
FIG. 1 is a perspective view of a seat assembly having a motor operatively coupled to gears, according to one embodiment of the present invention.

FIGS. 1-25 illustrate a system and method of controlling a seat assembly 10. As depicted in FIG. 1, an exemplary seat assembly 10 includes a seat back 12, a seat cushion 14, a seat base 16, a pair of adjuster assemblies 18, and a linkage assembly 20. The seat back 12 is rotatably coupled to the seat cushion 14. The linkage assembly 20 pivotably couples the seat cushion 14 to the seat base 16. The seat base 16 is transposable fore and aft along the pair of adjuster assemblies 18.

The seat assembly 10 also includes an electronic control unit (ECU) 22, a motor 24 having a drive shaft 26 extending from the motor 24, and one or more gears 28 operatively coupled with the drive shaft 26. The ECU 22 controls the movement and positioning of the seat assembly 10 by controlling power to the motor 24 which drives the gears 28. The ECU 22 not only controls the movement and positioning of the seat assembly 10, but it also monitors these activities to ensure that they are working properly over time.

Figure 2:
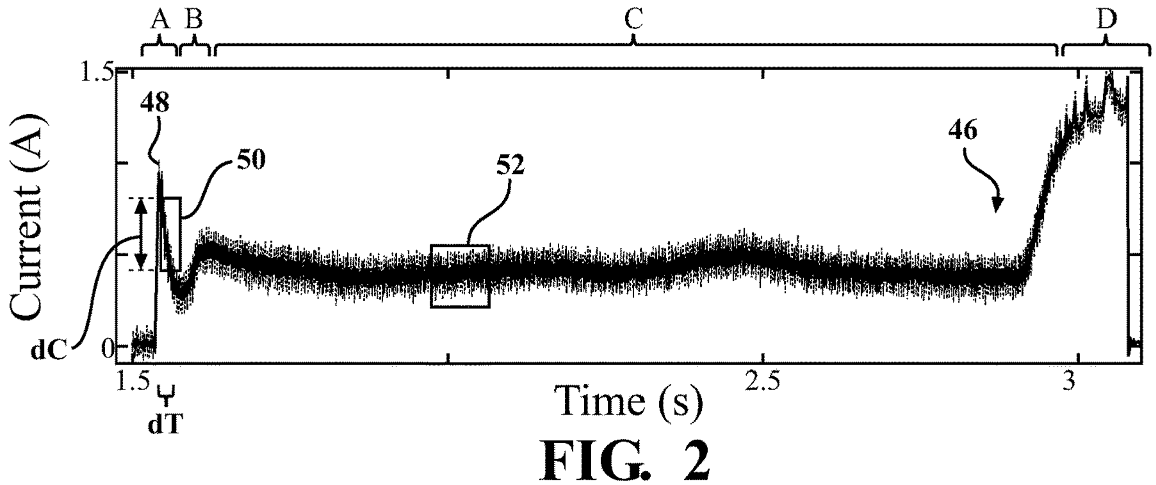
FIG. 2 is a graphical representation of current drawn by the motor during movement of the seat assembly.

The ECU 22 is configured to monitor the current drawn by the motor 24 during operation, as reflected in an exemplary current waveform 46 shown in FIG. 2. When the motor 24 initially receives power, the motor 24 begins to rotate the drive shaft 26 causing the one or more gears 28 to rotate. The current drawn by the motor 24 rapidly increases as the motor 24 initiates rotation of the drive shaft 26 and the one or more gears 28, as well as initiating movement of equipment tied to gears 28, as reflected in portion A of the current waveform 46 in FIG. 2. After the gears 28 start moving, less power is needed to drive the gears 28. Therefore, the current will begin to decrease after it reaches a peak 48, as reflected in portion B of the current waveform 46. Portion C shows the current waveform 46 during steady state conditions. Portion D of FIG. 2 shows the current waveform 46 when the gears 28 and/or the seat assembly 10 encounter an expected or unexpected impact or obstruction.

In the embodiment shown in FIG. 1, the motor 24 is a bushed direct current (DC) motor 24, the internal components of which generate a ripple effect on the current drawn by the motor 24. However, the ripples in the raw current waveform 46 are mixed with electrical noise from the commutator, ADC noise, and transient conditions. The systems and methods described below separate the electrical noise and the transient conditions from the ripples in the raw current waveform 46 to isolate the current ripples, which can then be used to indicate the motor 24 rotation speed and/or position.

Figure 3:
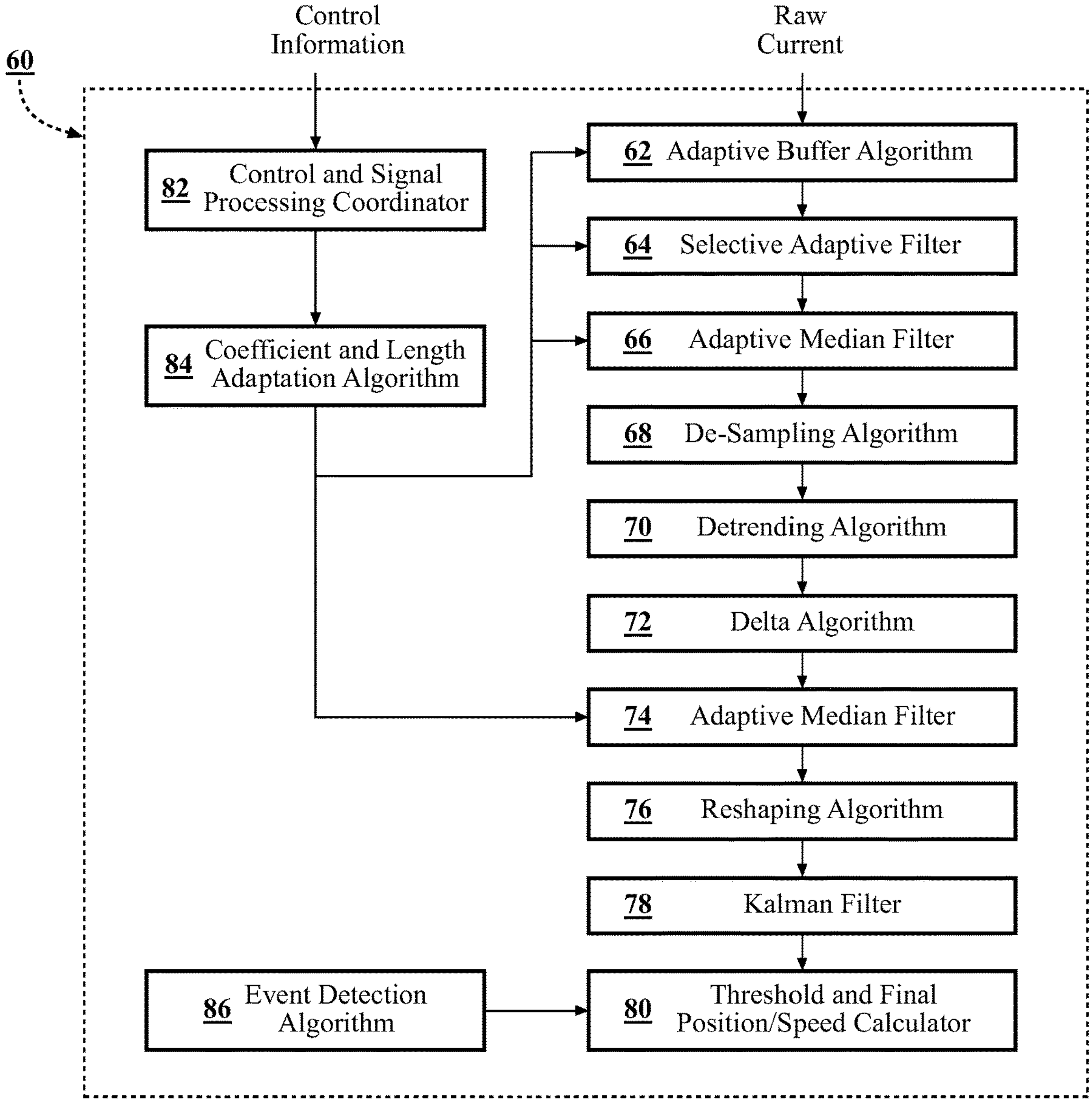
FIG. 3 illustrates a system for determining motor position and speed, according to one embodiment of the present invention.

FIG. 3 illustrates a system 60 for determining the position and/or speed of the motor 24 from the raw current waveform 46 drawn by the motor 24 according to one embodiment of the present invention. The system 60 includes an adaptive buffer algorithm 62, a selective adaptive filter 64, an adaptive median filter 66, a de-sampling algorithm 68, a detrending algorithm 70, a delta algorithm 72, a second adaptive median filter 74, a reshaping algorithm 76, a Kalman filter 78 and a threshold and final position/speed calculator 80. The system 60 also includes a control and signal processing coordinator 82, a coefficient and length adaptation algorithm 84, and an event detection algorithm 86. The system 60 initiates when the ECU 22 sends power to the motor 24 to move the seat assembly 10. The raw current waveform 46 drawn by the motor 24 is initially processed by the adaptive buffer algorithm 62.

Figure 4:
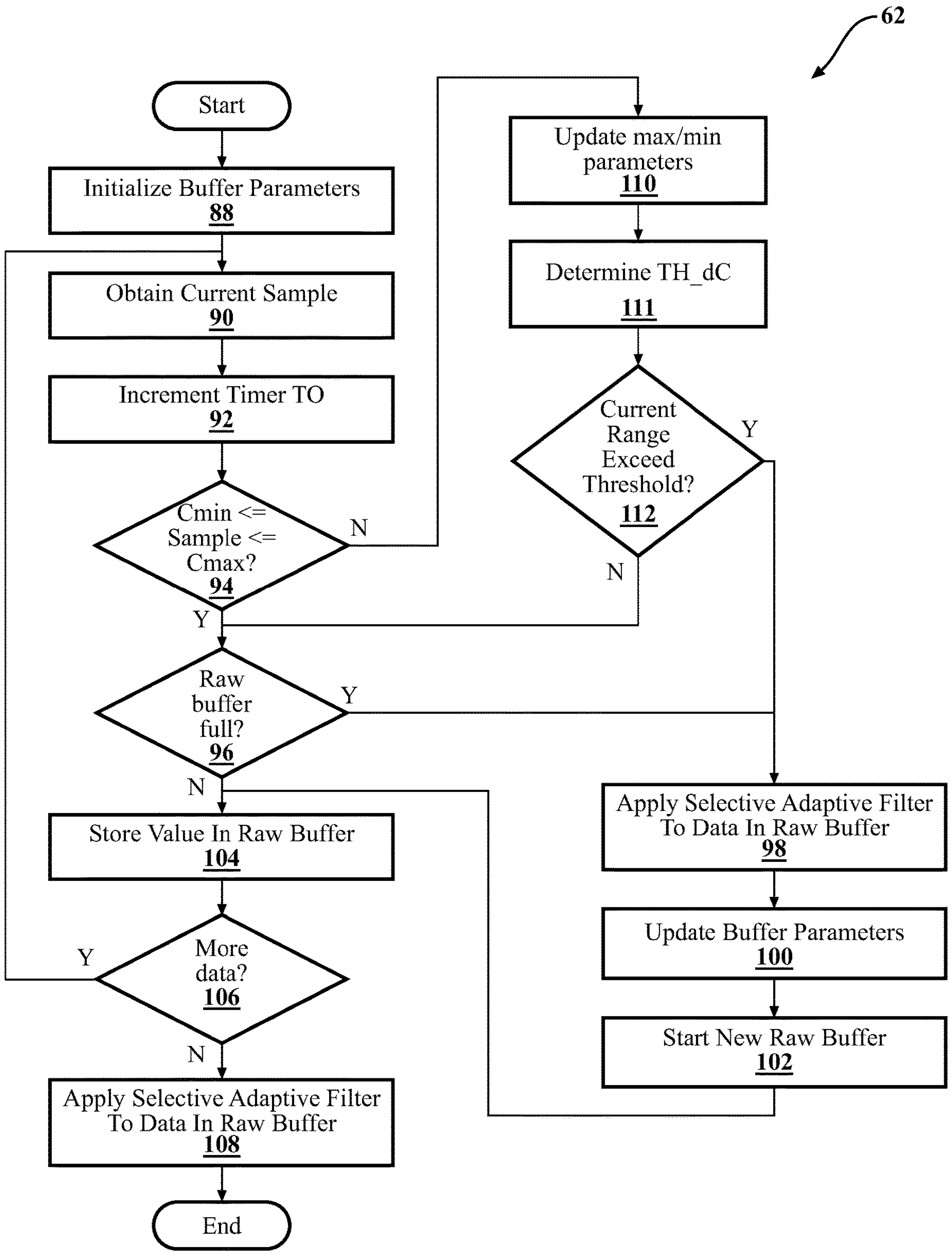
FIG. 4 is a flow chart of the adaptive buffer algorithm of FIG. 3.
Figure 5:
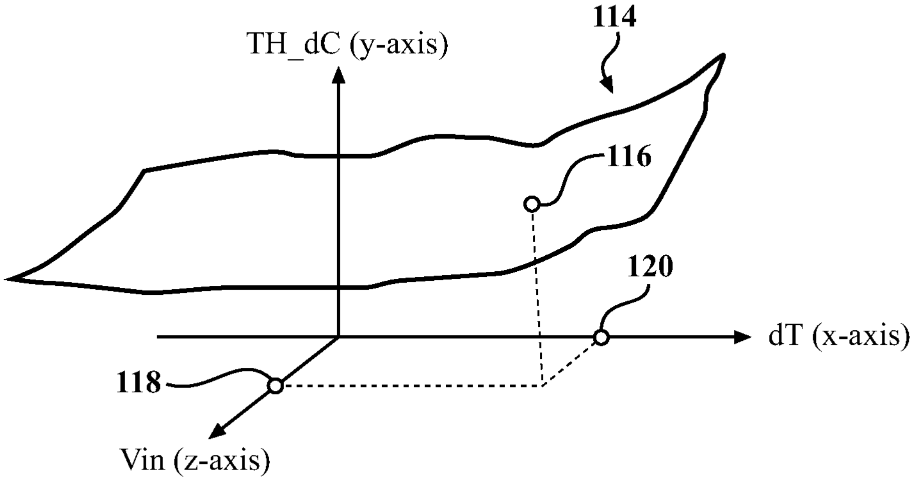
FIG. 5 is an exemplary surface plot for determining a delta current threshold, according to one embodiment of the present invention.

The adaptive buffer algorithm 62 places the current samples into raw current buffers for processing. The size of the raw current buffers differs depending on whether the current is in transient conditions or steady state. Referring to FIG. 4, in the adaptive buffer algorithm 62, the ECU 22 begins by initializing the buffer parameters (step 88). The buffer parameters include a maximum buffer size Bmax, a timer T0, a minimum current stored in the buffer Cmin, the relative time at which the minimum current was recorded T1*m*, a maximum current stored in the buffer Cmax, and the relative time at which the maximum current was recorded TIM. An exemplary maximum buffer size Bmax is about 30-40 samples, but may be adjusted to reflect the motor 24 being evaluated. During initialization, the timer T0, the relative time at which the minimum current was recorded T1*m*, the relative time at which the maximum current was recorded TIM, the minimum current stored in the buffer Cmin, and the maximum current stored in the buffer Cmax are set to zero.

After initializing the buffer parameters (step 88), the ECU 22 obtains a sample of the current from the motor 24 (step 90) and increments the timer T0 (step 92). The timer T0 identifies the relative time at which each current value is read into the buffer. Alternatively, the ECU 22 may record the actual time that the current value is read into the buffer. The ECU 22 then determines whether the current value is between Cmin and Cmax (step 94). If the ECU 22 determines that the current value is between Cmin and Cmax, then the ECU 22 determines if the raw buffer is full (step 96) by determining whether T0 exceeds Bmax. If the raw buffer is full, then the ECU 22 applies the selective adaptive filter 64 to the data in the raw buffer (step 98). The ECU 22 then updates the buffer parameters (step 100) by resetting the timer T0, the minimum timer T1*m* and the maximum timer TIM to zero, and by setting the minimum current Cmin and the maximum current Cmax equal to the raw current value. The ECU 22 then starts a new raw buffer (step 102) and stores the raw current value into the raw buffer (step 104). The ECU 22 also performs step 104 if, at step 96, it determined that the raw buffer was not full. The ECU 22 then determines if there is still current running through the motor 24 (i.e., if the motor 24 is still running) (step 106). If the motor 24 is still running, then the ECU 22 returns to step 90 to obtain the next current value. Otherwise, the ECU 22 applies the selective adaptive filter 64 to the data remaining in the raw buffer (step 108).

At step 94, if the raw current value is less than the minimum current Cmin, then the minimum current Cmin is set equal to the raw current value and minimum timer T1*m* is set equal to the timer T0 (step 110). Also at step 94, if the raw current value is greater than the maximum current Cmax, then the maximum current Cmax is set equal to the raw current value and maximum timer TIM is set equal to the timer T0 (step 110). The ECU 22 then determines a current range threshold TH_dC (step 111) based on the difference in time (i.e., delta time dT) between the maximum current and the minimum current (i.e., T1M−T1*m*).

$$dT = T1M - T1m \quad \text{(equation 1)}$$

The current range threshold TH_dC may be determined based on the line voltage Vin received by the ECU 22 in addition to the difference in time dT. The line voltage Vin is the battery voltage and may vary in magnitude based on temperature, load on the battery, the amount of stored charge in the battery, the battery age, the battery state of health, and the like as non-limiting examples. The current range threshold TH_dC may be determined using a lookup table listing values of threshold TH_dC based on the line voltage Vin and delta time dT. Alternatively, the current range threshold TH_dC may be determined using a three-dimensional surface plot 114 as reflected in FIG. 5 where the x-axis reflects delta time dT, the z-axis reflects the line voltage Vin, and the y-axis reflects the threshold TH_dC. As shown, the plot 114 may be used to determine the current range threshold TH_dC 116 based on the value of Vin 118 and the value of dT 120.

The ECU 22 then determines whether the current range (i.e., delta current dC) exceeds the current range threshold TH_dC (step 112). The current range dC is the difference between the maximum current Cmax and the minimum current Cmin (i.e., Cmax-Cmin).

$$dC = Cmax - Cmin \quad \text{(equation 2)}$$

If the current range dC exceeds the current range threshold TH_dC, then the ECU 22 proceeds with step 98 to apply the selective adaptive filter 64 to the data in the raw buffer. If the current range dC does not exceed the threshold TH_dC, then the ECU 22 proceeds with step 96 to determine whether the raw buffer is full.

As discussed above, the ECU 22 applies the selective adaptive filter 64 to the data in the raw buffer if the current range dC exceeds a threshold TH_dC (step 112) or if the raw buffer is full (step 96). Thus, the ECU 22 uses the adaptive buffer algorithm 62 to temporally divide the raw current values into sections based on size and variations in the raw current values. The amount of data processed by the selective adaptive filter 64 is based in part on delta current over delta time dC/dT. For example, as reflected in FIG. 2, buffer 50 has fewer raw current values than buffer 52 since buffer 50 occurs during transient conditions (portions A, B) and buffer 52 occurs during steady state conditions (portion C).

Figure 6:
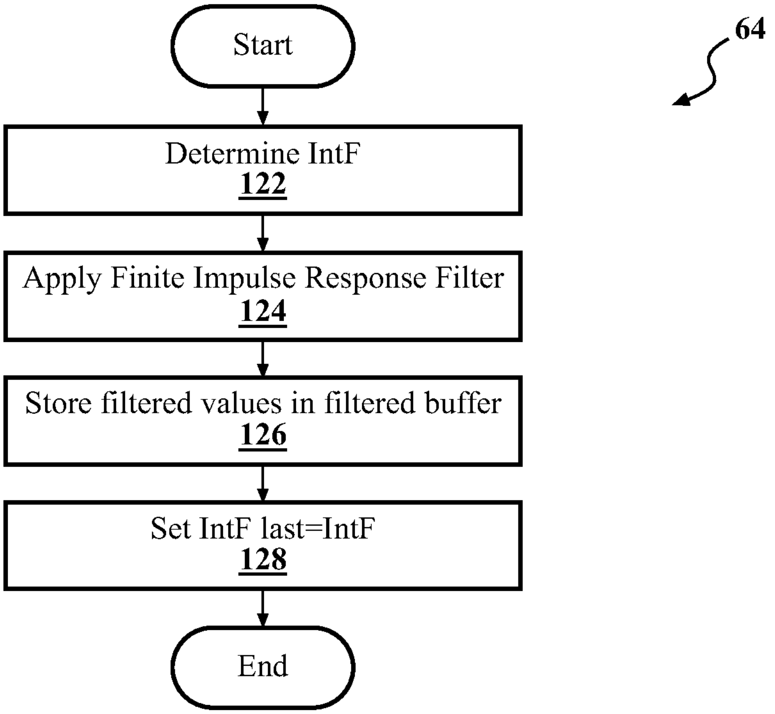
FIG. 6 is a flow chart of the selective adaptive filter of FIG. 3.

Referring to FIG. 3, after running the adaptive buffer algorithm 62, the ECU 22 applies the selective adaptive filter 64 on the data stored in the raw buffers. The buffer parameters that are initialized at step 88 (FIG. 4) include integration parameters that are processed by the selective adaptive filter 64. The integration parameters include the last integration factor IntF_last, a maximum integration factor IntF_max, a minimum integration factor IntF_min, an incremental delta D_inc, a decremental delta D_dec, and a threshold TH_IF for the integration factor IntF. The last integration factor IntF_last is initially set to zero, while the remaining integration parameters are predefined parameters stored in memory. These remaining integration parameters may be determined based on experimentation during a design phase and optionally may be determined based on calibration of the seat assembly 10. Referring to FIG. 6, in the selective adaptive filter 64, the ECU 22 begins by determining the integration factor IntF for the current raw buffer (step 122).

Figure 7:
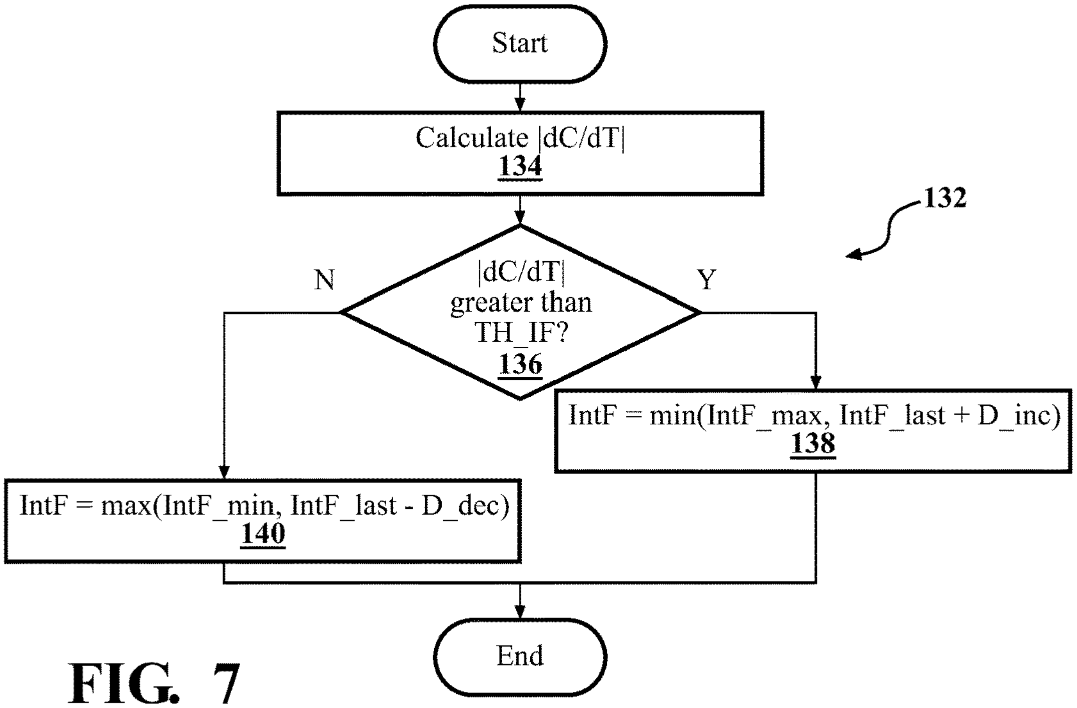
FIG. 7 is a flow chart of a method of determining an integration factor, according to one embodiment of the present invention.

A first method 132 to determine the integration factor IntF (step 122) is shown in FIG. 7. The ECU 22 initially calculates the absolute value of delta current dC divided by delta time dT|dC/dT| (step 134). Next, the ECU 22 determines if the absolute value of delta current dC divided by delta time dT| dC/dT| is greater than the threshold TH_IF (step 136). If the absolute value of delta current dC divided by delta time dT|dC/dT| is greater than threshold TH_IF, then the ECU 22 calculates a new integration factor IntF as the minimum value of the maximum integration factor IntF_max and the last integration factor IntF_last plus delta increment D_inc (step 138, equation 3).

$$IntF = \text{min(Inf\_max, IntF\_last + D\_inc)} \quad \text{(equation 3)}$$

If at step 136 the absolute value of delta current dC divided by delta time dT|dC/dT| is not greater than the threshold TH_IF, then the ECU 22 calculates a new integration factor IntF as the maximum value of the minimum integration factor IntF_min and the last integration factor IntF_last minus the delta decrement D_dec (step 140, equation 4)

$$IntF = \text{max(IntF\_min, IntF\_last} - \text{D\_dec)} \quad \text{(equation 4)}$$

Figure 8:
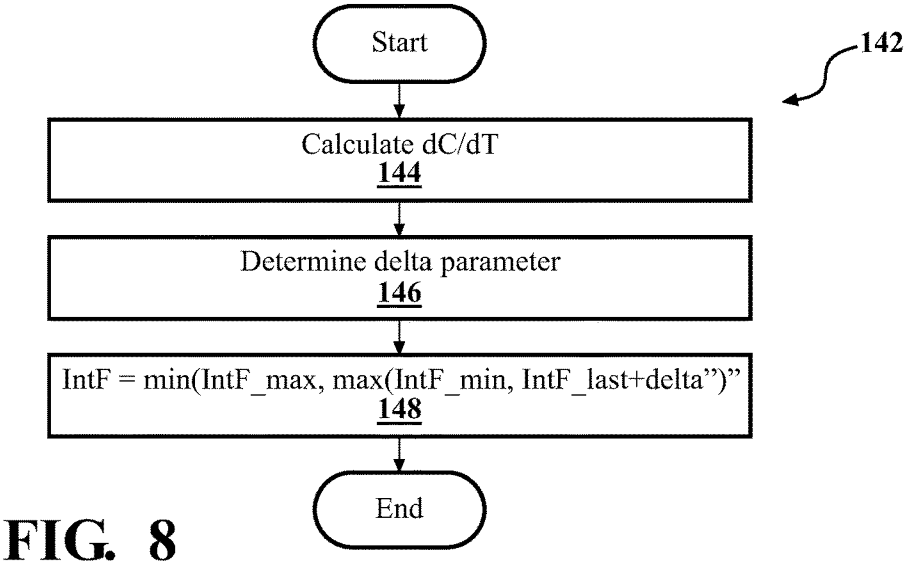
FIG. 8 is a flow chart of another method of determining an integration factor, according to another embodiment of the present invention.
Figure 9:
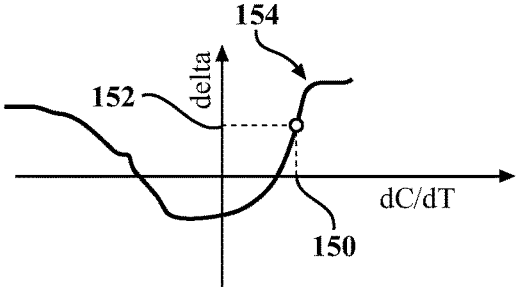
FIG. 9 is an exemplary graph comparing a delta function with the change in current divided by the change in time (dC/dT)

A second method 142 to determine the integration factor IntF (step 122) is shown in FIG. 8. The ECU 22 initially calculates the delta current dC divided by delta time dT dC/dT (step 144). The ECU 22 uses the delta current dC divided by delta time dT dC/dT to determine a delta parameter (step 146). FIG. 9 shows an exemplary graph 154 illustrating the delta parameter 152 as a function of the delta current dC divided by delta time dT dC/dT 150. The delta parameter 152 may be determined from the graph 154. Alternatively, the ECU 22 may use a lookup table that lists values of the delta parameter 152 for various dC/dT ratios 150.

Returning to FIG. 8, after the delta parameter 152 is determined (step 146), the ECU 22 calculates a new integration factor IntF by a) adding the last integration factor IntF_last and delta (IntF_last+delta), b) selecting the maximum value of the minimum integration factor IntF_min and IntF_last+delta, and c) selecting the minimum of IntF_max and max (IntF_min, IntF_last+delta) (step 148 and equation 5).

$$IntF = \min(\text{IntF\_max}, \max(\text{IntF\_min}, \text{IntF\_last} + \text{delta})) \quad \text{(equation 5)}$$

Returning to FIG. 6, after determining the integration factor IntF at step 122, the ECU 22 applies a finite impulse response (FIR) filter to the data in the raw buffer (step 124) and stores the filtered data into a filtered buffer (step 126). Alternatively, the ECU 22 may apply a rolling average (RA) filter or an infinite impulse response (IIR) filter rather than the FIR filter without varying the scope of the present invention.

The FIR filter uses a number m of past raw current values to create a newly filtered signal using equation 6 shown below where X(k) is the raw current value at time k and Y(k) is the output of the FIR filter at time k. The number m of historical raw current values used to filter a specific raw current value may be a predetermined value stored in memory. Alternatively, the number m also may be determined or adjusted based on the integration factor IntF, the delta current dC, the delta time dT, and the like as non-limiting examples without varying the scope of the present invention. The relative weights of the FIR coefficients $w_0 \ldots w_m$ for the FIR filter are determined based on the integration factor IntF, and the sum of the FIR coefficients is equal to 1 (equation 7).

$$Y(k) = w_0 * X(k) + w_1 * X(k-1) + \ldots + w_m * X(k-m) \quad \text{(equation 6)}$$

$$w_0 + w_1 + \ldots + w_m = 1 \quad \text{(equation 7)}$$

Figure 10:
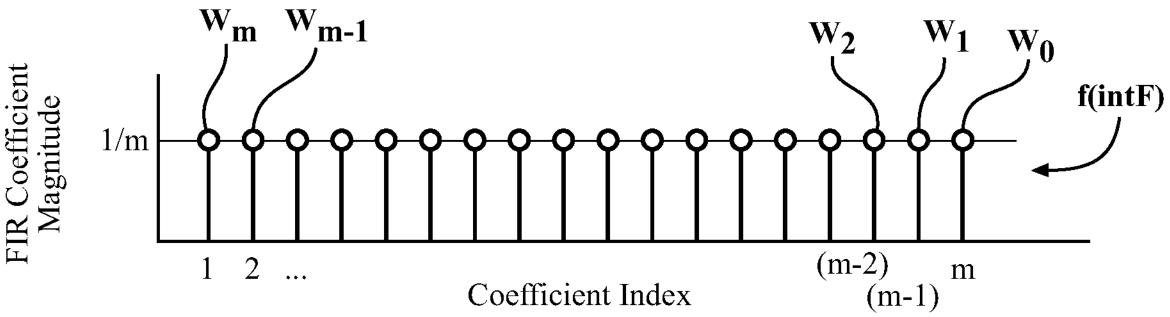
FIGS. 10-13 illustrate how the magnitude of finite impulse response coefficients vary with changes to the integration factor.
Figure 11:
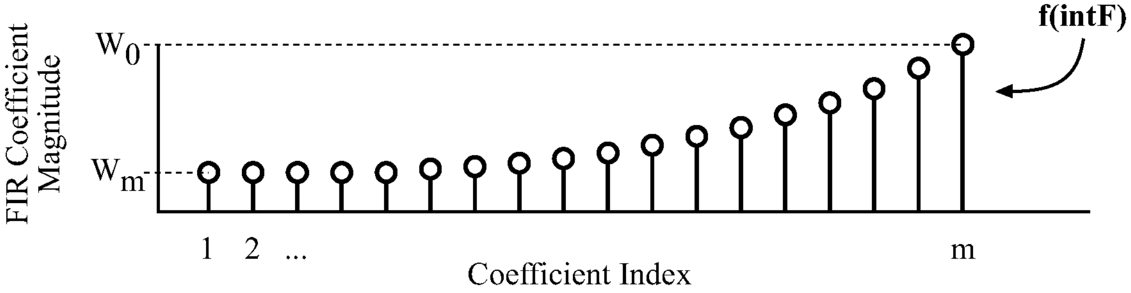
Figure 12:
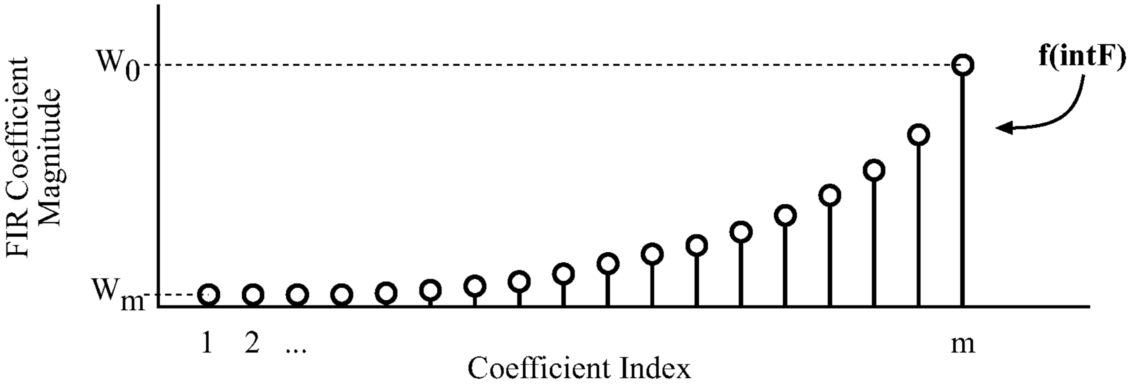

FIGS. 10-12 graphically illustrate how the FIR coefficients vary with changes to the integration factor IntF. FIG. 10 illustrates the FIR coefficients when the integration factor IntF is equal to 0, FIG. 11 shows the FIR coefficients when the integration factor IntF is larger than 0 but less than the maximum integration factor IntF_max, and FIG. 12 shows the FIR coefficients when the integration factor IntF is equal to the maximum integration factor IntF_max.

Referring to FIG. 10, when the integration factor IntF is equal to 0, all of the raw current samples are weighed equally, and the FIR coefficients have an equal magnitude of 1/m. Referring to FIG. 11, as the integration factor IntF increases, the FIR coefficients for the newer raw current samples increase as the FIR coefficients for the older raw current samples decrease. Thus, as the integration factor IntF increases, the FIR filter places greater weight on coefficients for the newer raw current samples in comparison to the coefficients for older raw current samples. Referring to FIG. 12, at the maximum integration factor IntF_max, the FIR coefficients for the oldest raw sample currents become negligible and, in some cases, may be 0, thereby reducing the number m of raw current values used to filter the raw current samples.

Figure 13:
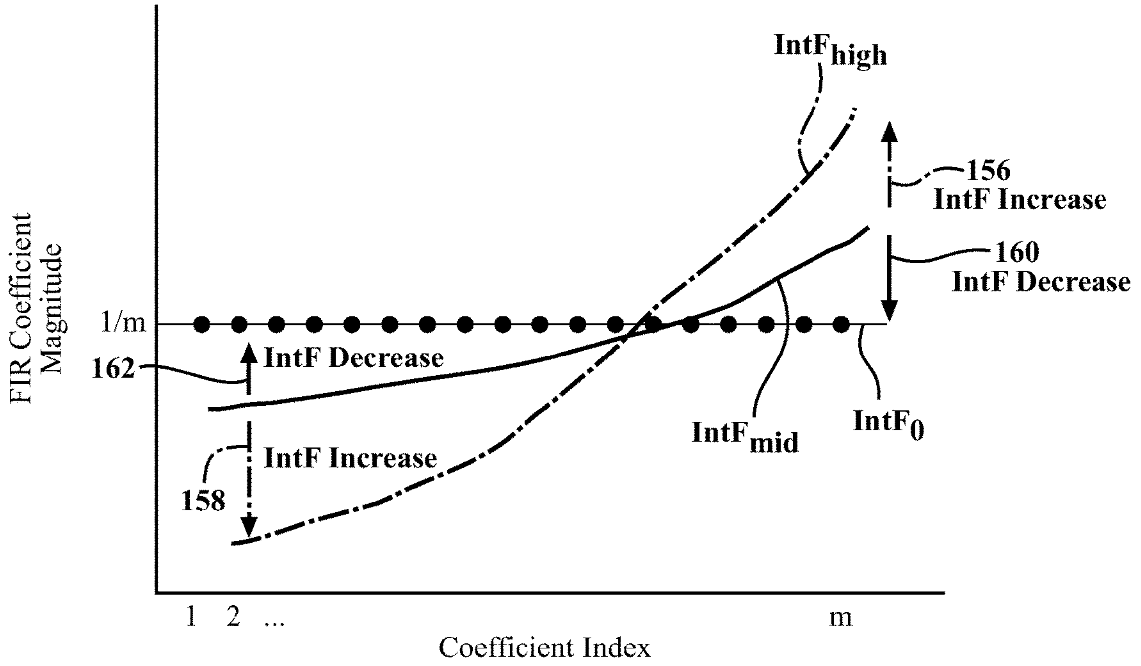
Figure 14:
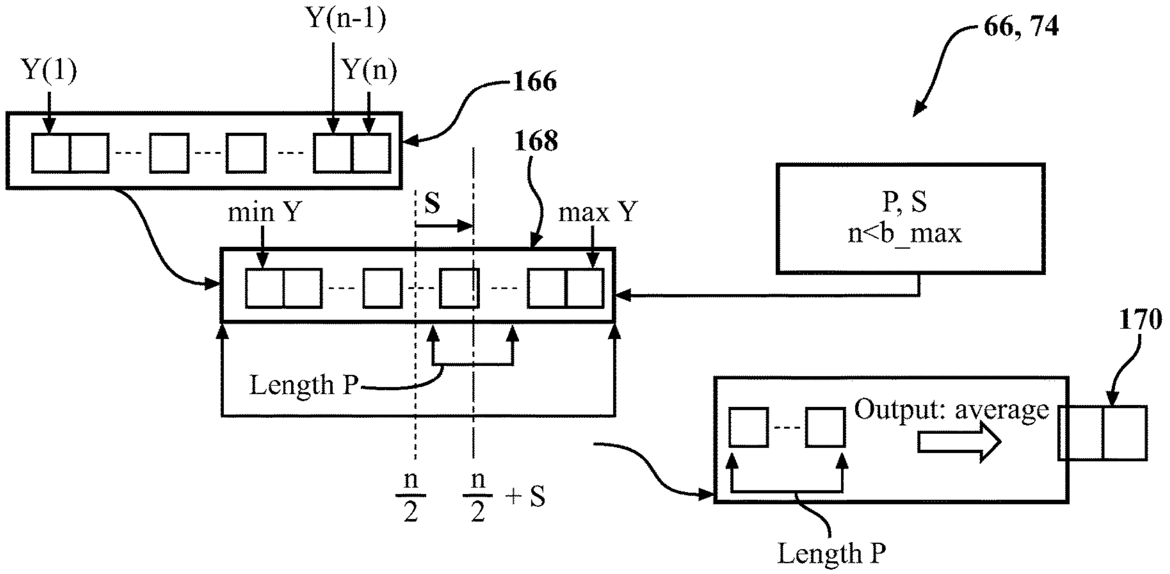
FIG. 14 is a diagrammatic representation of the adaptive median filter of FIG. 3.

As reflected in FIG. 13, the relationship between the coefficient magnitude and the coefficient indices varies as a function of the integration factor IntF. As the integration factor IntF increases from $IntF_{mid}$ to $IntF_{high}$, more weight is put on the new data entering the filter (arrow 156) and less weight is put on the older data (arrow 158) to shorten the response time. As the integration factor IntF decreases from $IntF_{mid}$ to $IntF_0$, less weight is put on the new data entering the filter (arrow 160) and more weight is put on the old data (arrow 162) until all data is treated equally when the integration factor IntF reaches zero $IntF_0$. The magnitude of the coefficients alternatively may be determined based on a lookup chart listing values for each coefficient for ranges of the integration factor IntF.

The selective adaptive filter 64 adjusts the weights wm of the filter coefficients and the number m of past raw current values used in the filter based on the amount of variation in the raw current values in the raw buffer. Adjusting the filter coefficients and the number of past raw current values improves the response time of the filter in comparison to using fixed filter coefficients and a fixed number of past values. The selective adaptive filter 64 shortens the response time of the filter when transient conditions are detected. In contrast, the selective adaptive filter 64 increases the response time of the filter during steady state conditions. Adjusting the filter response time relative to the amount of local variation in raw current values allows for noise to be filtered from the current waveform 46 while preserving the current ripples.

Returning to FIG. 6, after storing the filtered data at step 126, the ECU 22 sets the last integration factor IntF_last to the current integration factor IntF (step 128) to process the next raw buffer. Referring to FIG. 3, after applying the selective adaptive filter 64, the ECU 22 applies the Adaptive Median Filter 66 to the data in the filtered buffer. The adaptive median filter 66 is shown in more detail in FIGS. 14 and 15.

Figure 15:
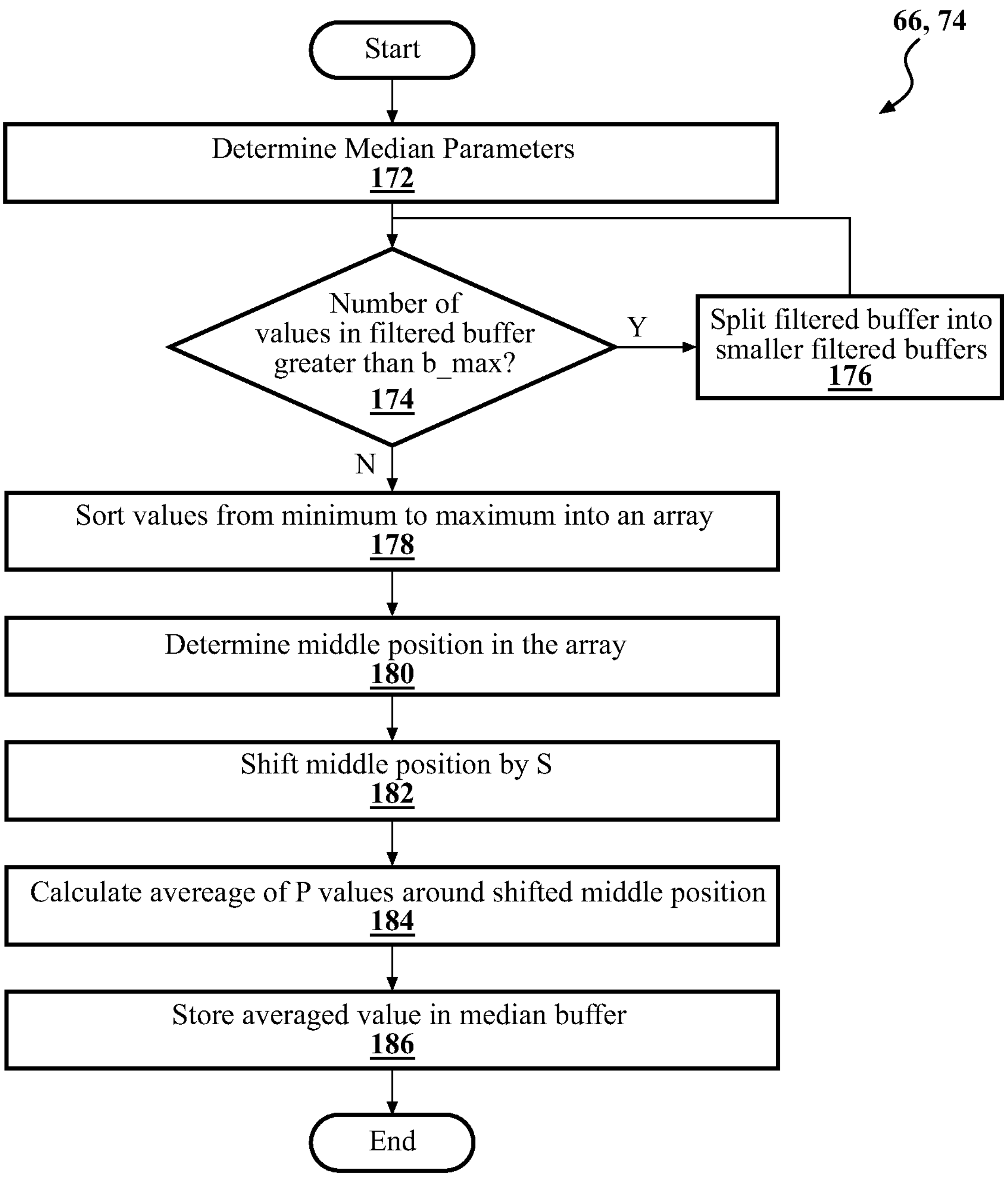
FIG. 15 is a flow chart of the adaptive median filter of FIG. 3.

Referring to FIG. 15, the ECU 22 initially determines the median parameters (step 172). The median parameters include the maximum buffer size b_max, the shift S in the median value and the number of filtered current values P that are used to calculate a mean value. The values for length P, shift S, and maximum buffer size b_max may be predetermined values stored in memory in the ECU 22. Those design parameter values are derived through optimization of the experimental data. The ECU 22 also may determine and/or adjust these values based on the amount of variation in the filtered buffer, the detected transient conditions, the delta current dC, the delta time dT, the integration factor IntF, and/or other conditions detected by the ECU 22.

Next, the ECU 22 determines if the size of the filtered buffer exceeds the maximum buffer size b_max (step 174). If the size of the filtered buffer exceeds the maximum buffer size, then the ECU 22 splits the filtered buffer into smaller filtered buffers (step 176) until the size of the filtered buffer is less than the maximum b_max. The ECU 22 then sorts the filtered current values from a minimum value to a maximum value (step 178). For example, as reflected in FIG. 14, if the filtered buffer 166 includes n values, the ECU 22 sorts the values from min Y to max Y in array 168. Next, the ECU 22 determines the middle position (the n/2th value) in the array 168 (step 180) and shifts the middle position by shift S to obtain a shifted middle position (the n/2+Sth value) (step 182). If n is an odd number, the ECU 22 rounds n/2 up to the next integer. The middle position is shifted to a shifted middle position to reduce the effect of transient conditions.

The ECU 22 then determines the average of P filtered current values centered around the shifted middle position (step 184) and stores this "modified median value" in a median buffer 170 (step 186). The ECU 22 may adjust the value of P to ensure that the median is calculated properly (e.g., if n is even, the ECU 22 adjusts P to be even). In some instances, the ECU 22 may apply a standard median filter to the data in the filtered buffer. A standard median filter is obtained by setting the length P equal to 1 and setting shift S equal to 0.

Figure 16:
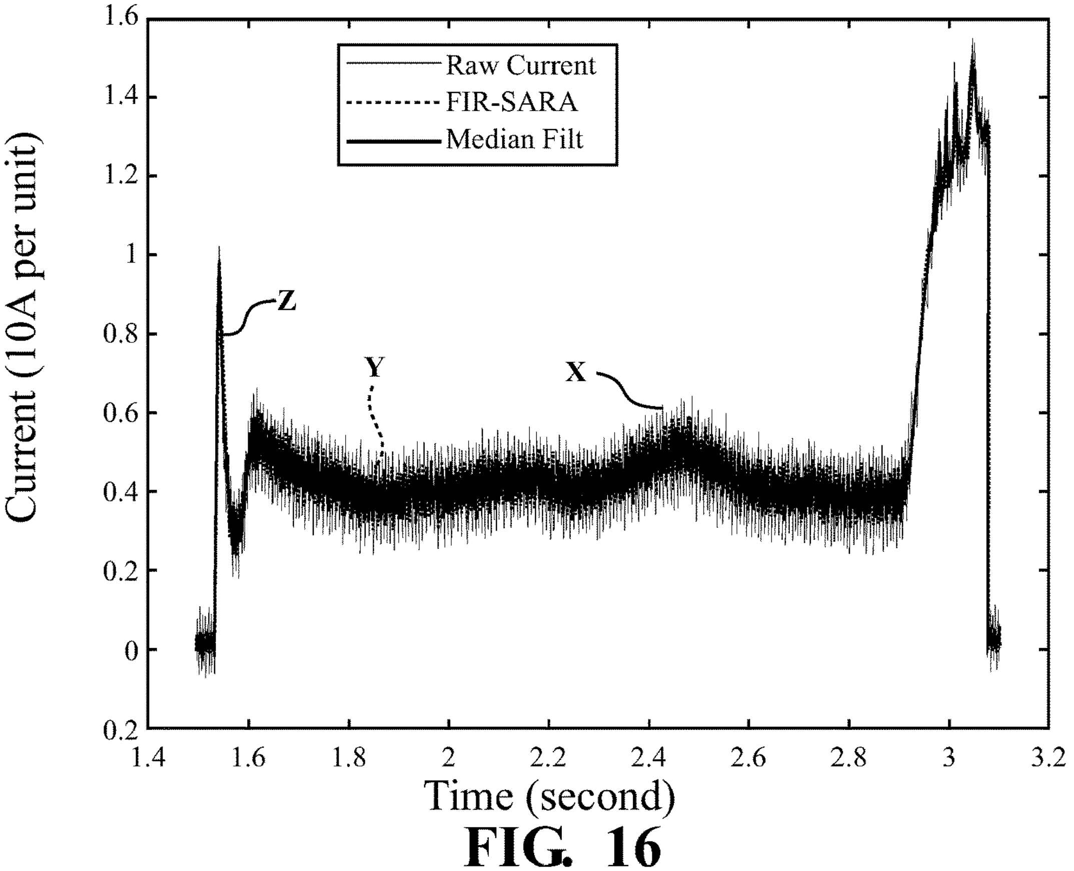
FIG. 16 is a graphical representation of the changes to the current waveform of FIG. 2 as the current is processed according to one embodiment of the present invention.
Figure 17:
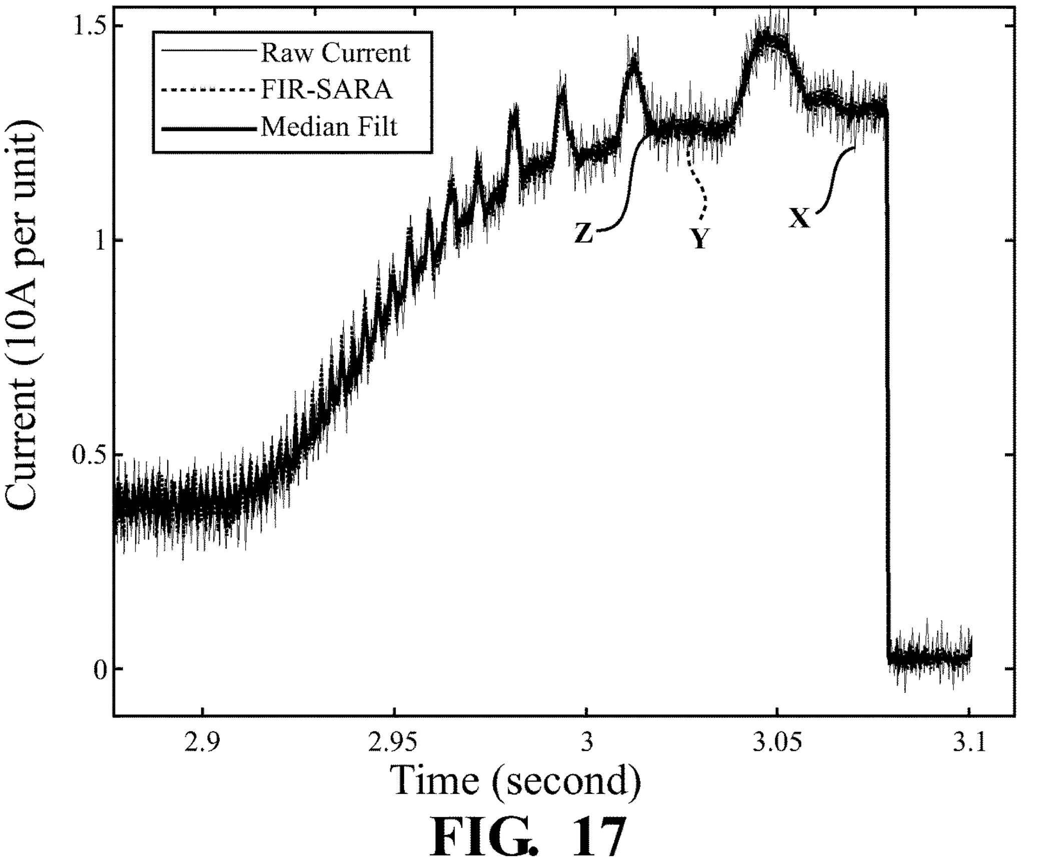
FIG. 17 is an enlarged graphical representation of a portion of the current waveform shown in FIG. 16.
Figure 18:
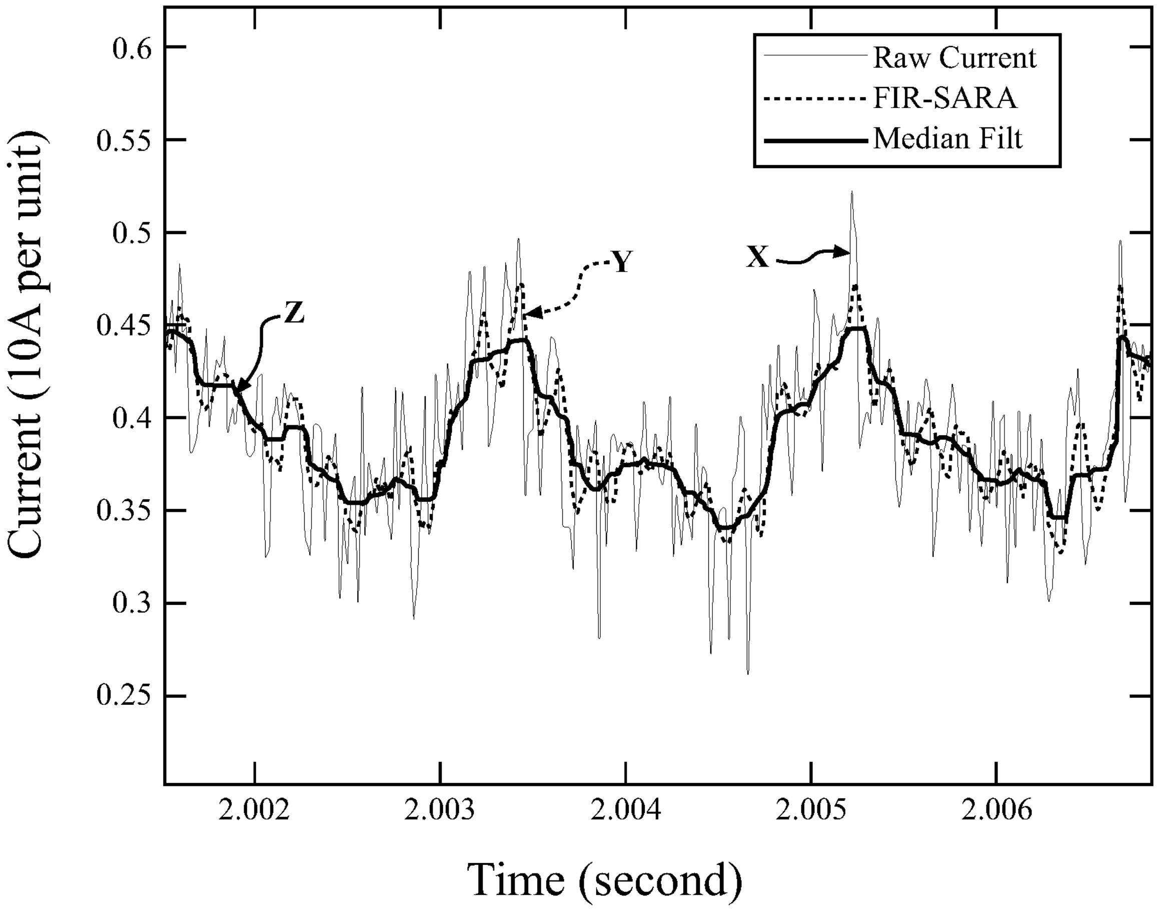
FIG. 18 is an enlarged graphical representation of a portion of the current waveforms shown in FIG. 16.

FIGS. 16-18 illustrate the effect of applying the selective adaptive filter 64 and the adaptive median filter 66 to the raw current waveform 46 (X). FIG. 16 shows the effect on the entire current waveform 46 from FIG. 2, while FIG. 17 shows an enlarged view of the effect when the seat assembly 10 encounters an expected or unexpected impact or obstruction (portion D of FIG. 2) and FIG. 18 shows an enlarged view of the effect during steady state conditions (portion C of FIG. 2).

As reflected in FIGS. 16-18, the raw current waveform 46 (X) has greater fluctuations than the filtered current Y because the selective adaptive filter 64 filters a portion of the noise out of the raw current waveform 46 (X) while minimizing distortions in the filtered current waveform Y caused by the filtering process. Similarly, the filtered current Y has greater fluctuations than the modified median filtered data Z because the adaptive median filter 66 removes localized spikes in the filtered current Y while maintaining shifts in the filtered raw current values Y(k) that are indicative of jumps in amplitude related to movement of the seat assembly 10. The adaptive median filter 66 is configurable to emphasize edged effects in the filtered buffers and to provide a balance between smoothness and abrupt transitions in the filtered current values Y(k). The median current waveform Z tracks closely to the general shape of the raw current waveform 46 (X) and the filtered current waveform Y with a reduction of the fluctuations caused by noise.

The selective adaptive filter 64 requires a high resolution signal to process the data. Thus, the raw current values are logged at a high speed at about 1 sample per millisecond when they are processed through the adaptive buffer algorithm 62, the selective adaptive filter 64 and the adaptive median filter 66. A slower sample rate of about 1 sample per 5 milliseconds is sufficient for remainder of the system 60. Accordingly, referring to FIG. 3, the ECU 22 applies a de-sampling algorithm 68 to the median filtered values to reduce the sample rate, which also reduces the amount of processing required by the ECU 22. The de-sampling algorithm 68 is further illustrated in FIG. 19.

Figure 19:
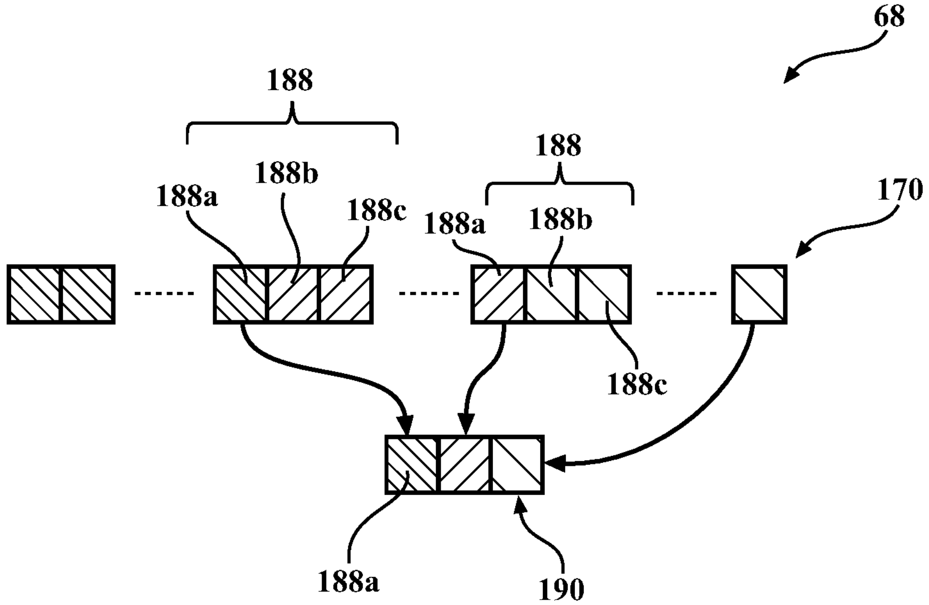
FIG. 19 is diagrammatic representation of the de-sampling algorithm of FIG. 3.

Referring to FIG. 19, the ECU 22 de-samples the data in the median buffer 170 by a predetermined amount. For example, when the ECU 22 de-samples by a factor of three, the ECU 22 partitions the data stored in the median buffer 170 into groups 188 of three consecutive median values 188*a*, 188*b*, 188*c*. Next, the ECU 22 stores the first value 188*a* in each group 188 into a de-sampled buffer 190 and discards the next two values 188*b*, 188*c*. The ECU 22 repeats the de-sampling process for each group 188 of three values 188*a*, 188*b*, 188*c* stored in the median buffer 170.

Figure 20:
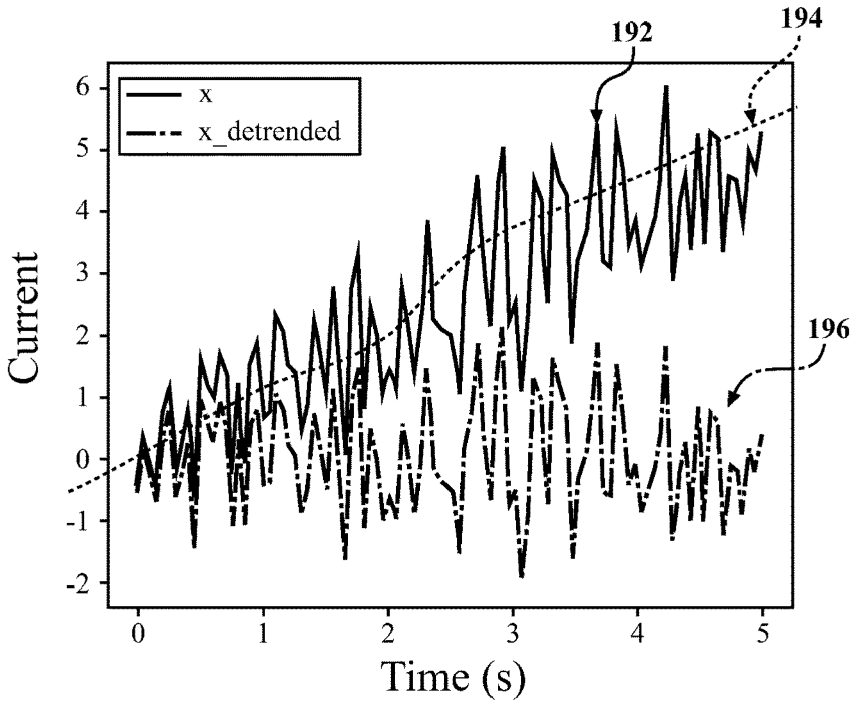
FIG. 20 is an enlarged graphical representation of the waveform of FIG. 18 after processing according to one embodiment of the present invention.

Referring to FIG. 3, after the ECU 22 applies the de-sampling algorithm 68, the ECU 22 applies a detrending algorithm 70 to the de-sampled values. Referring to FIG. 20, the ECU 22 determines a trend 194 in the de-sampled waveform 192 and subtracts the trend 194 from the de-sampled waveform 192 to produce a detrended waveform 196.

Figure 21:
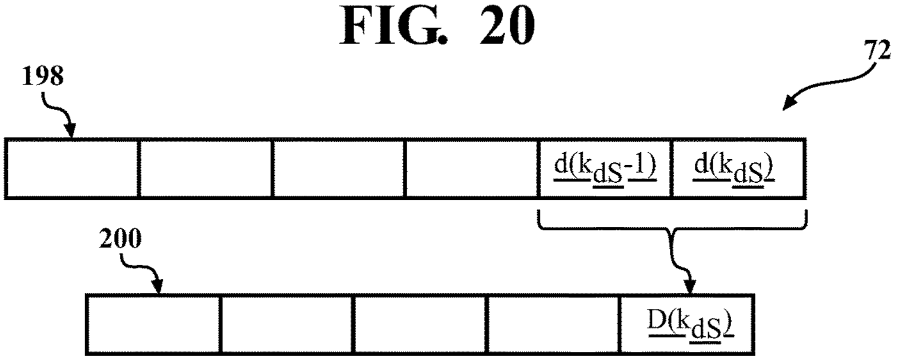
FIG. 21 is a diagrammatic representation of the delta algorithm of FIG. 3.

Next, referring to FIG. 3, the ECU 22 applies a delta algorithm 72 to the detrended values. The delta algorithm 72 further reduces any interference from trends within the current waveform 46. Referring to FIG. 21, in the delta algorithm 72, the ECU 22 obtains successive detrended values from the detrended buffer 198, calculates a delta value as the difference between these successive detrended values, and stores the delta values in a delta buffer 200. For example, if $D(k_{dS})$ is the delta value at de-sampled time $k_{dS}$, $d(k_{dS})$ is the detrended value at de-sampled time $k_{dS}$, and $d(k_{dS}-1)$ is the detrended value at de-sampled time $k_{dS}-1$, the ECU 22 calculates the delta value $D(k_{dS})$ using equation 8 shown below:

$$D(k_{dS}) = d(k_{dS}) - d(k_{dS} - 1) \quad \text{(equation 8)}$$

Referring to FIG. 3, after applying the delta algorithm 72, the ECU 22 applies a second adaptive median filter 74 to the delta values D. In some embodiments, the ECU 22 may omit the second adaptive median filter 74 without varying the scope of the present invention. The second adaptive median filter 74 uses the same process shown in FIG. 15 for the adaptive median filter 66. The ECU 22 may select values for length P, shift S, and maximum buffer size b_max for the second adaptive median filter 74 based on predetermined values and/or based on the amount of variation detected in the delta values D in the delta buffer 200.

Figure 22:
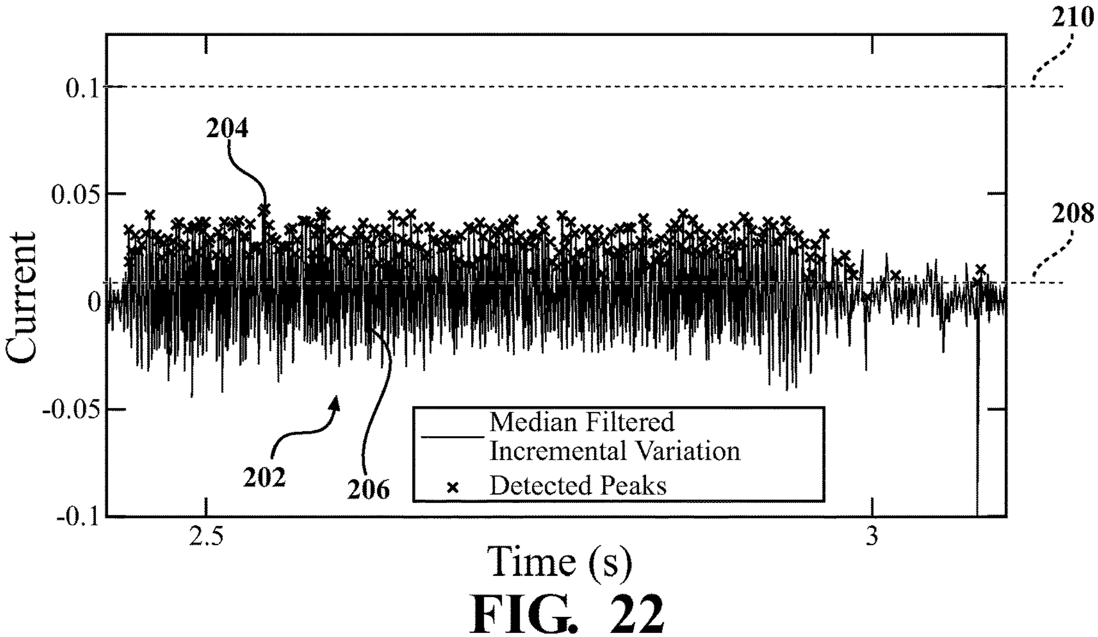
FIG. 22 is a graphical representation of the waveform of FIG. 16 after processing according to one embodiment of the present invention.

Referring to FIG. 3, the ECU 22 next applies a reshaping algorithm 76 to the median delta waveform. FIG. 22 illustrates an exemplary median delta waveform 202 for the median delta values D. The delta waveform 202 includes local peaks 204 as well as non-peak values 206. The local peaks 204 generally correspond to the current ripples in the raw current waveform 46 with the non-peak values 206 generally corresponding to noise in the current waveform 46.

Figure 23:
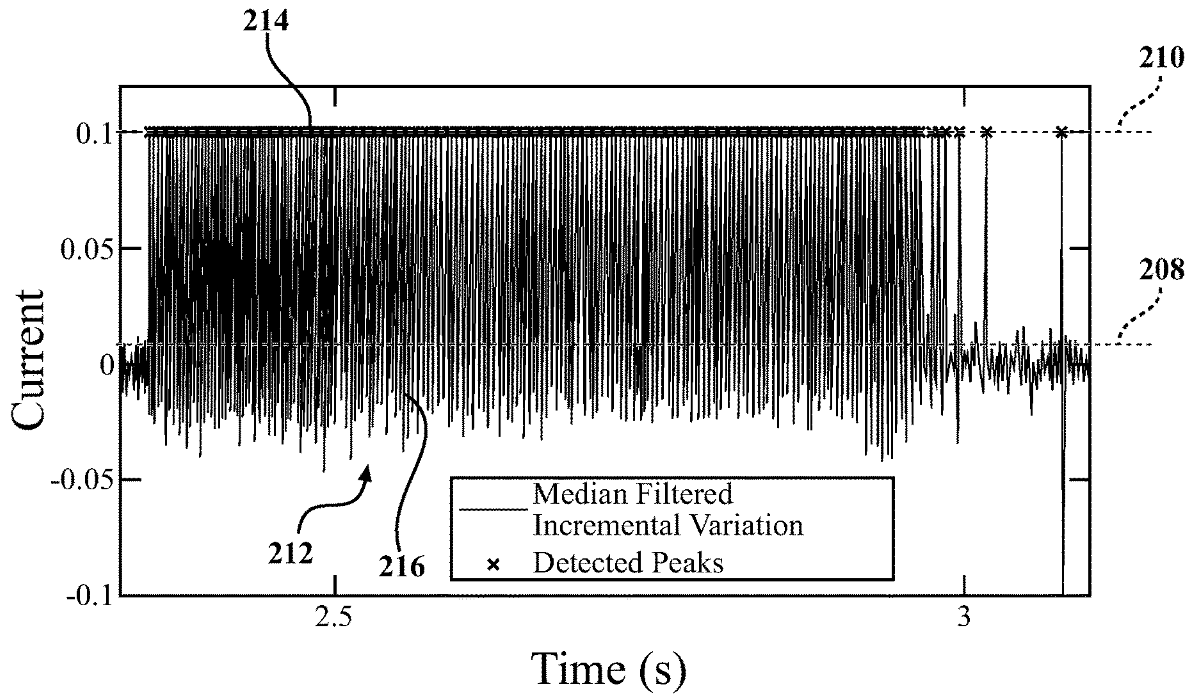
FIG. 23 is a graphical representation of the waveform of FIG. 22 after processing according to one embodiment of the present invention.
Figure 24:
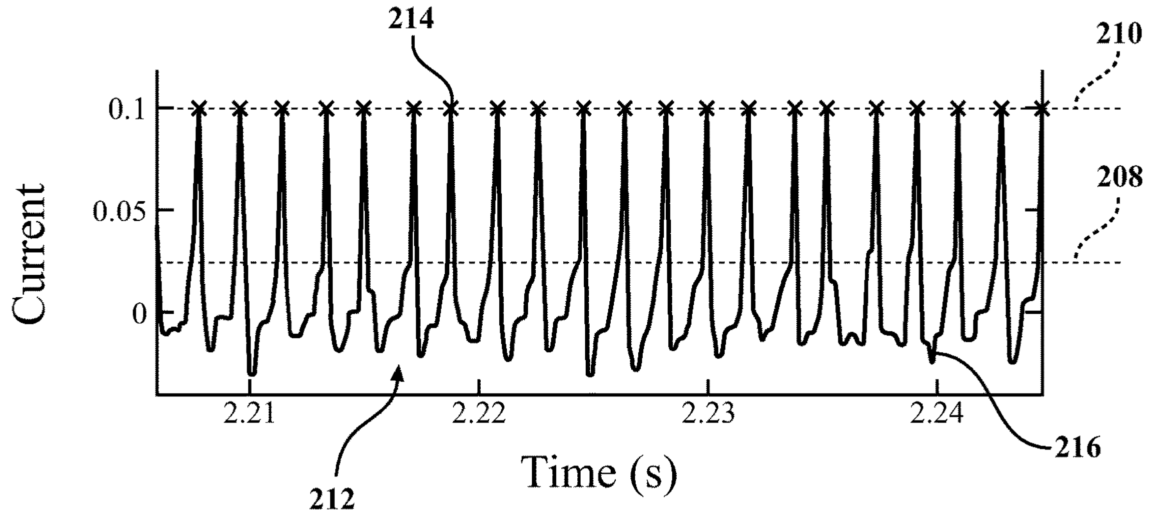
FIG. 24 is an enlarged graphical representation of a portion of the waveform of FIG. 23.

The reshaping algorithm 76 reshapes the delta waveform 202 to enhance the separation between the local peaks 204 and the non-peak values 206. To reshape the delta waveform 202, the ECU 22 selects the local peaks 204 having a magnitude greater than a predetermined threshold 208 and shifts these local peaks 204 to have a magnitude corresponding to a predetermined raised level 210. As shown in FIGS. 22 and 23, the shifted local peaks 214 have a magnitude of the raised level 210 while the remaining portion of the delta waveform 216 (i.e., the noise values) has the same magnitude in both the reshaped delta waveform 212 and the original delta waveform 202. FIG. 24 shows an enlarged view of a portion of the reshaped delta waveform 212 of FIG. 23.

Referring to FIG. 3, the reshaped delta waveform 212 is filtered using a Kalman filter 78 to further separate the shifted local peaks 214 from the noise values 216. It will be appreciated that the Kalman filter 78 may be omitted without altering the scope of the present invention. After the ECU 22 processes the reshaped delta waveform 212 through the optional Kalman filter 78, the ECU 22 applies a threshold and final position/speed calculator 80 to determine the speed and/or position of the motor 24.

Figure 25:
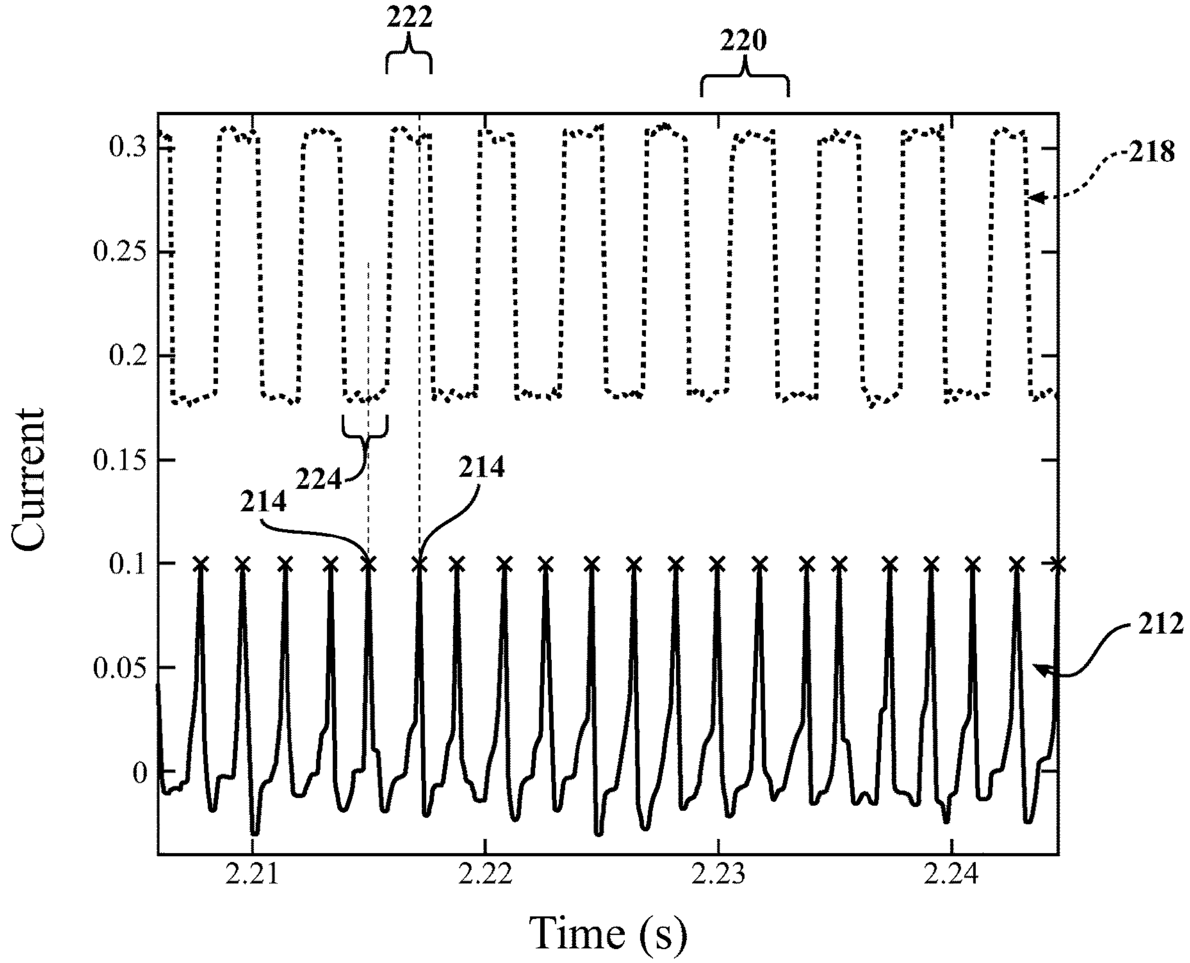
FIG. 25 is a graphical representation comparing the waveform of FIG. 24 with corresponding hall effect pulses.

FIG. 25 shows a comparison of the reshaped delta waveform 212 and the corresponding hall effect waveform 218 produced by a hall effect sensor when it is operatively coupled to the drive shaft 26 of the DC motor 24. In FIG. 25, the hall effect waveform 218 is shifted in amplitude to improve clarity. The hall effect waveform 218 includes a plurality of spaced apart hall effect pulses 220 having a high portion 222 and a low portion 224. Comparing the hall effect waveform 218 with the reshaped delta waveform 212, the reshaped delta waveform 212 includes a shifted local peak 214 for each of the high and low portions 222, 224 of the hall effect waveform 218. As reflected in FIG. 25, the shifted local peaks 214 occur during the respective high and low portions 222, 224 of the hall effect pulses 220. However, the shifted local peaks 214 may drift within the respective high and low portions 222, 224 of the hall effect pulses 220 over time.

Each local peak 214 in the reshaped delta waveform 212 generally corresponds to a current ripple in the current waveform 46. Thus, the ECU 22 uses the shifted local peaks 214 in the reshaped delta waveform 212 to determine the ripple counts. The ECU 22 then determines the rotational position and speed of the motor drive shaft 26 based on the ripple counts. The method to determine the rotational position and speed from the ripple counts is similar to methods used to determine the rotational position and speed based on the hall effect waveform with modifications to account for having ripple counts in place of the hall effect pulses 220.

Referring to FIG. 3, the ECU 22 also obtains control information relating to the position of the seat assembly 10, requests received to reposition the seat assembly 10, and/or the power provided to the motor 24. The ECU 22 uses the control information and the control and signal processing coordinator 82 to coordinate processing of the raw current values through the components of the system 60, including whether to process the data through the second adaptive median filter 74 and the Kalman filter 78.

The ECU 22 uses the coefficient and length adaption algorithm 84 to adjust one or more parameters of the adaptive buffer algorithm 62, the selective adaptive filter 64 and the adaptive median filters 66, 74. The parameters include one or more of variation parameters, integration parameters, adaptive median filter parameters and the like as non-limiting examples.

Referring to FIG. 3, the system 60 also includes an event detection algorithm 86. The ECU 22 uses the event detection algorithm 86 to detect impacts related to movement of the seat assembly 10 such as the seat assembly 10 reaching an end of travel, impacting an obstruction, and the like as non-limiting examples. The ECU 22 may modify the determined rotational position and speed based on any event that it detects to avoid over- or undercounting of the current ripples.

As discussed above, the system 60 of the present invention provides motor speed and position feedback based on current ripples in the current waveform 46 drawn by the motor 24 without relying on a hall effect sensor. The elimination of the hall effect sensor improves system level reliability as well as reduces overall cost of the seat assembly 10.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A method for monitoring a motor within a seat assembly in an automotive vehicle, the method comprising the steps of:

measuring raw current values drawn by the motor to reposition the seat assembly;

temporally dividing the raw current values into sections based on size and variations in the raw current values;

filtering the raw current values in each section to obtain filtered current values;

determining a median value of the filtered current values for each section to obtain a plurality of sequential median values;

determining a trend in the plurality of sequential median values;

removing the trend from the plurality of sequential median values to obtain detrended values;

determining a difference in magnitude between successive detrended values to obtain delta values;

identifying a plurality of peaks in the delta values;

determining which of the plurality of peaks has an amplitude greater than a threshold, wherein the peaks having an amplitude greater than the threshold correspond to detected local peaks within the filtered current values; and determining a rotational position or a speed based on the detected local peaks.

2. The method as set forth in claim 1, wherein the step of filtering the raw current values comprises the steps of:

applying an adaptive filter to the raw current values to obtain the filtered current values, wherein the adaptive filter includes a plurality of filter coefficients; and adjusting the plurality of filter coefficients based on the variations in the raw current values.

3. The method as set forth in claim 2, wherein the adaptive filter comprises a finite impulse response filter, a rolling average filter, or an infinite impulse response filter.

4. The method as set forth in claim 1, further comprising the step of:

filtering the delta values using a Kalman filter prior to identifying the plurality of peaks in the delta values.

* * * * *